United States Patent [19]

Kassai

[11] Patent Number: 4,554,992
[45] Date of Patent: Nov. 26, 1985

[54] HYDRAULICALLY OPERATED FOUR WHEEL SWEEPER

[75] Inventor: Denes P. Kassai, Chino, Calif.

[73] Assignee: FMC Corporation, Chicago, Ill.

[21] Appl. No.: 530,833

[22] Filed: Sep. 9, 1983

[51] Int. Cl.$^4$ ............................................. B60K 26/00
[52] U.S. Cl. ..................................... 180/307; 60/451
[58] Field of Search ............... 180/306, 307, 308, 242; 60/451, 447, 444

[56] References Cited

U.S. PATENT DOCUMENTS

| | | | |
|---|---|---|---|
| 2,161,439 | 6/1939 | Thoma | 60/451 |
| 2,530,720 | 11/1950 | Paulson | 180/308 |
| 3,199,286 | 8/1965 | Anderson | 180/307 |
| 3,212,263 | 10/1965 | Hann | 180/307 |
| 3,310,825 | 3/1967 | Tamny | 15/82 |
| 3,636,580 | 1/1972 | Woodworth | 15/84 |
| 3,841,423 | 10/1974 | Holtkamp et al. | 180/306 |
| 3,902,566 | 9/1975 | Bird | 180/306 |
| 3,971,453 | 7/1976 | Patton et al. | 180/308 |
| 3,978,937 | 9/1976 | Chichester et al. | 180/307 |
| 4,011,768 | 3/1977 | Tessenske | 180/307 |
| 4,356,773 | 11/1982 | Van Eyken | 180/308 X |
| 4,396,087 | 8/1983 | Rock et al. | 180/243 |
| 4,478,041 | 10/1984 | Pollman | 60/444 |
| 4,481,769 | 11/1984 | Nagahara | 60/451 |

*Primary Examiner*—Joseph F. Peters, Jr.
*Assistant Examiner*—Mark C. Dukes
*Attorney, Agent, or Firm*—A. J. Moore; H. M. Stanley; R. B. Megley

[57] ABSTRACT

A hydrostatically operated vehicle, such as a street sweeper, includes an engine driven reversible hydrostatic pump coupled to a single hydrostatic pump driving wheels of the vehicle. The pump is shiftable from neutral to reverse and forward, low and high speed positions, and the hydrostatic motor is controlled between low and high speed positions with a metering valve automatically adjusting the motor speed in response to variation in reaction torque between the drive wheels and the ground. The vehicle also includes a reversible hydrostatic component drive system for powering motors which drive an elevator, pick-up broom and two gutter brooms in a forward working direction and which may be reversed for clearing debris jams by reversing the pump. The component drive system includes valve means for selectively driving the gutter brooms and for holding the gutter brooms inactive when the pump is driven in reverse.

3 Claims, 6 Drawing Figures

U.S. Patent  Nov. 26, 1985  Sheet 1 of 4  4,554,992
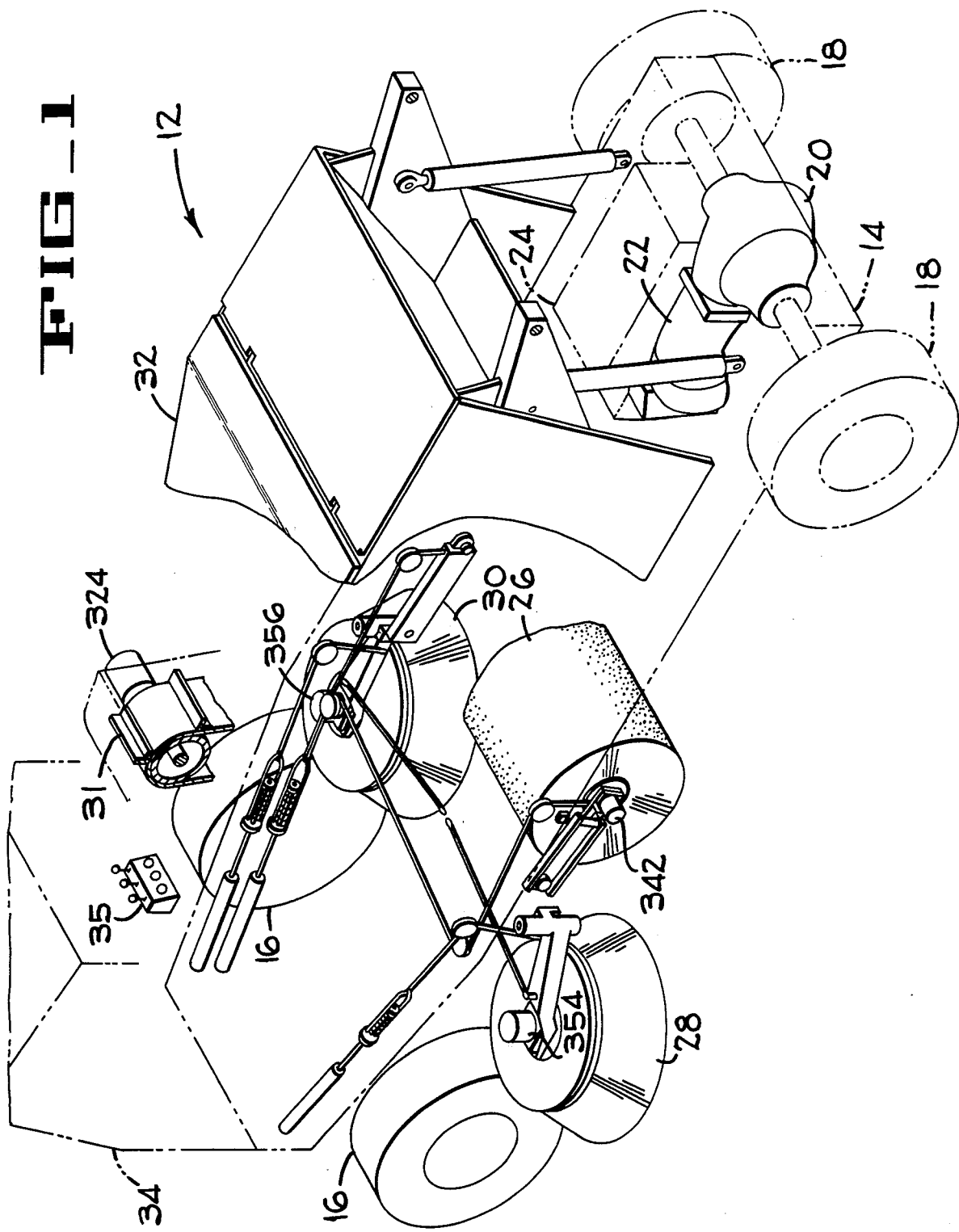
FIG_1

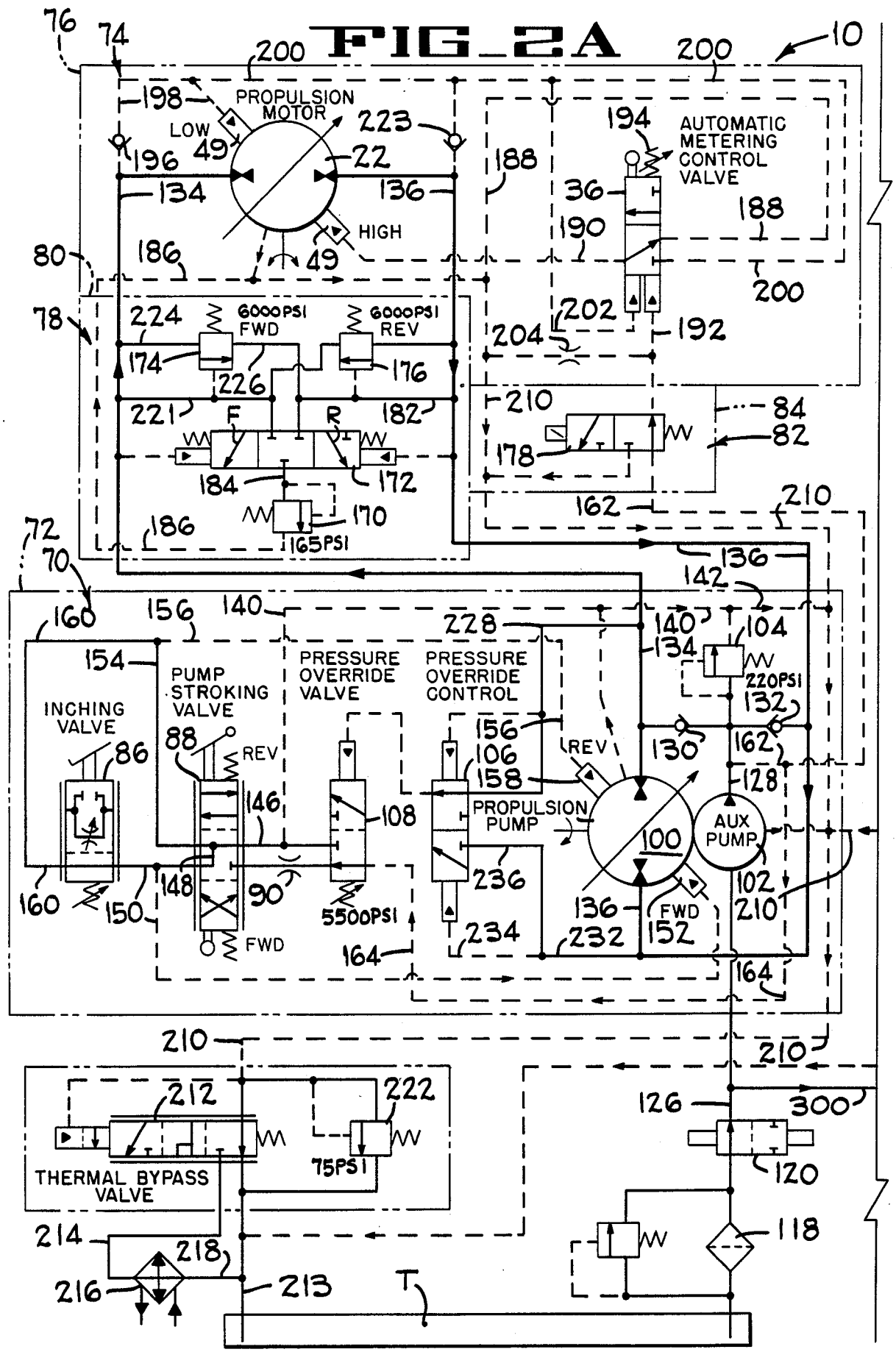

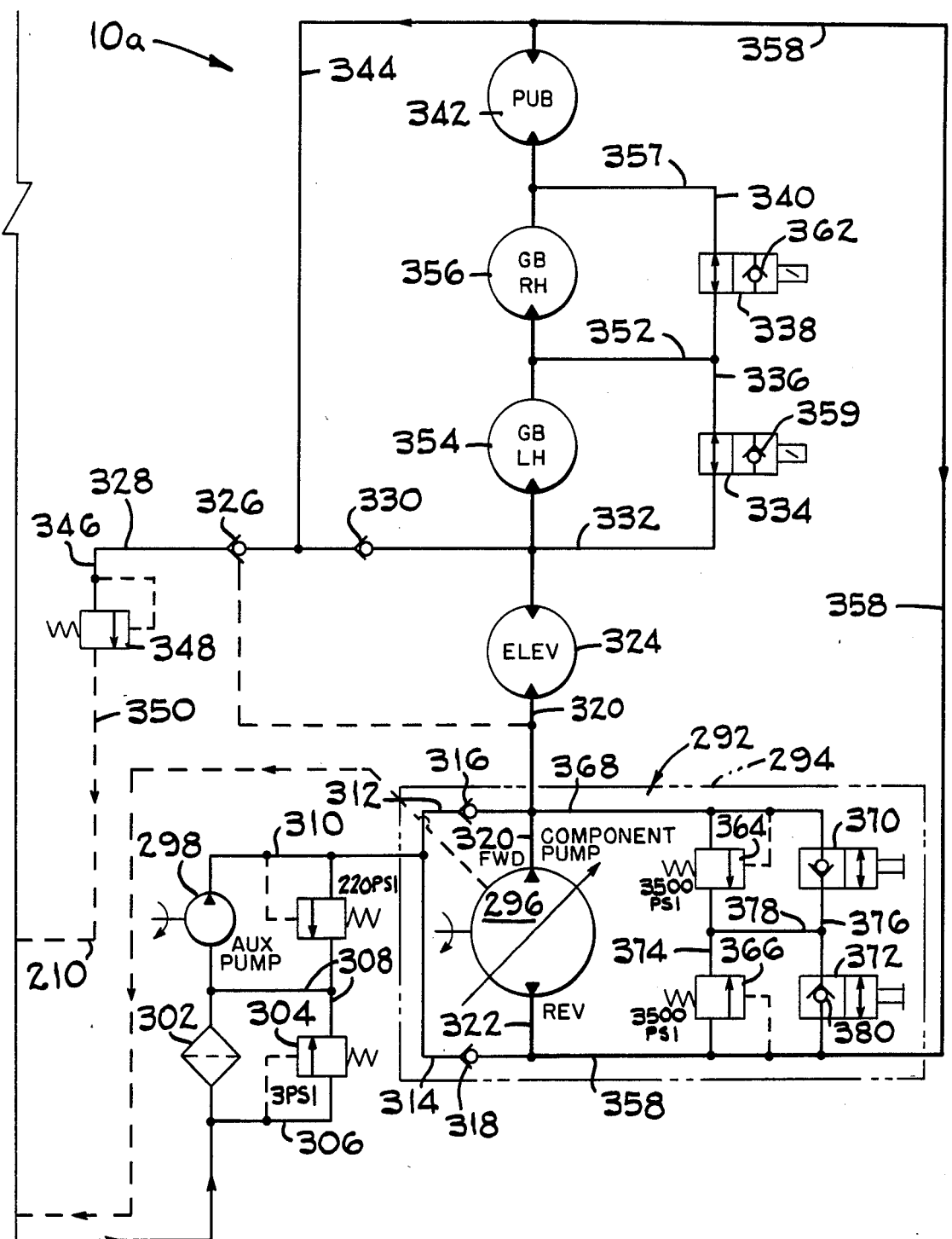
FIG_2B

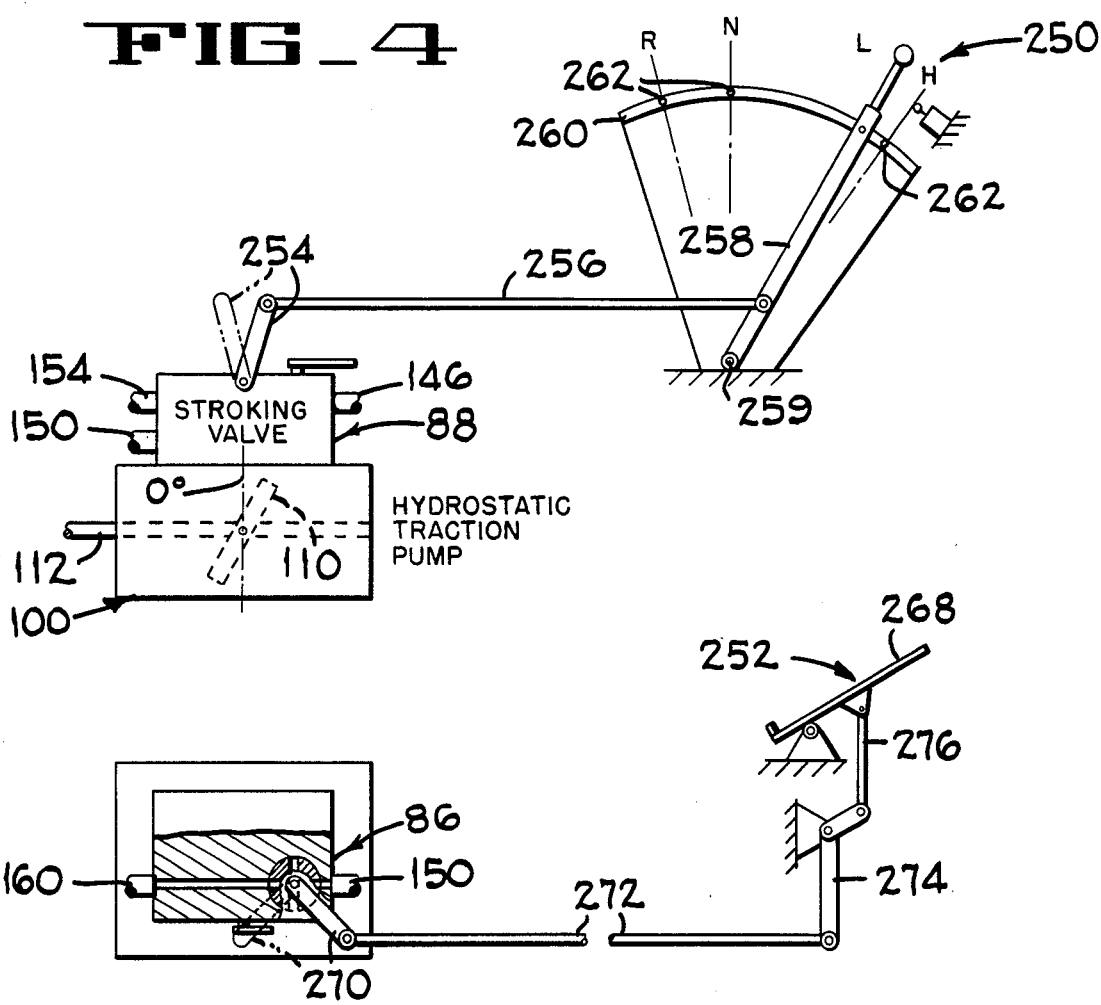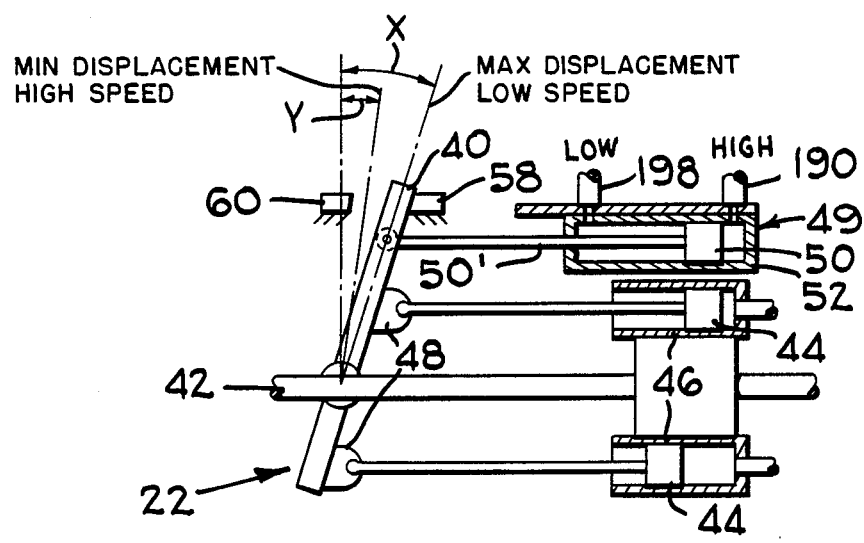

HYDRAULICALLY OPERATED FOUR WHEEL SWEEPER

CROSS REFERENCE TO RELATED APPLICATION

The present invention relates to my copending U.S. patent application Ser. No. 431,947 filed on Sept. 30, 1982 and entitled Sweeper With Hydraulically Driven Components now abandoned; and Ser. No 497,397 filed on May 23, 1983 and entitled Hydrostatic Propulsion System and Method With Inching Throttle and Brake.

BACKGROUND OF THE INVENTION

1. Field of the Invention

The present invention relates to street sweeping vehicles or the like and more particularly relates to street sweepers and method of operating the same with a hydrostatic propulsion system and a hydrostatic motor drive system, with the propulsion system having a pump stroking valve and an inching valve, and an automatic metering control valve capable of driving the vehicle at a high speed of about 50 miles per hour with a single hydrostatic motor and capable of varying the speed in response to variable reaction torque on the vehicle drive wheels.

2. Description of the Prior Art

Street sweepers with mechanical drives to the propulsion wheels are illustrated in U.S. Pat. No. 3,310,825 to Tamny dated Mar. 28, 1967; and Woodworth U.S. Pat. No. 3,636,580 which issued on Jan. 25, 1972.

SUMMARY OF THE INVENTION

The present invention is somewhat similar to the apparatus described in my above referred to copending applications which were designed as hydraulic propulsion systems for a relatively slow vehicle such as a three wheeled street sweeper.

The present invention relates to a hydrostatic propulsion system for a four wheel vehicle powered by a single hydrostatic motor coupled to a differential operatively connected to the vehicle drive wheels. The propulsion system includes an automatic metering valve which, when the vehicle is being driven in its high speed range, will vary its position in response to variations in torque applied to the hydrostatic motor from the drive wheels to provide an infinitely variable motor displacement. The invention also includes a hydrostatic motor drive system that includes a hydrostatic pump for directing fluid to several hydrostatic component drive motors in a forward or a reverse direction for driving the pick-up broom, the two gutter brooms, and an elevator.

BRIEF DESCRIPTION OF THE DRAWINGS

FIG. 1 is a diagrammatic perspective of the four wheel street sweeper powered by the hydrostatic propulsion system and hydrostatic motor drive system of the present invention.

FIG. 2A is a diagram of the hydrostatic propulsion drive system of the mobile street sweeper.

FIG. 2B is a hydraulic diagram for the hydrostatic drive system for driving the several hydraulic component motors in the sweeper.

FIG. 3 is a diagrammatic illustration of the swash plate propulsion drive motor.

FIG. 4 is a diagrammatic side elevation of a shift control mechanism connected to the stroking valve of a traction pump with the swash plate thereof being diagrammatically illustrated in a low, forward speed position.

FIG. 5 is a diagrammatic plan of the inching valve of the traction pump connected to an accelerator pedal shown in elevation.

DESCRIPTION OF THE PREFERRED EMBODIMENT

The hydrostatic propulsion system 10 (FIG. 2A) of the present invention is used in the propulsion drive system in a vehicle such as the illustrated street sweeper 12 (FIG. 1).

The street sweeper 12 comprises a chassis 14 mounted on a pair of steerable front wheels 16 and two rear wheels 18 connected together by a differential 20 which is coupled to a single hydrostatic motor 22. An engine 24 powers the hydrostatic propulsion system 10 which includes a component motor control system 10a (FIG. 2B) for driving a pick-up broom 26, left and right gutter brooms 28,30 and an elevator 31 which deposits collected debris into a pivotal hopper 32. An operator's cab 34 at the front of the vehicle 12 is provided with a plurality of hydraulic and electrical controls 35 within easy reach of the operator. A steering wheel, brake, and engine controls (not shown) are also included in the cab.

The hydrostatic propulsion system 10 (FIG. 2A) is similar to that disclosed in my cross-referenced U.S. application Ser. No. 497,397 except that the system is simplified and has fewer parts including only one hydrostatic propulsion motor 22 with an automatic metering speed control valve 36. The propulsion system 10 is capable of driving the vehicle at 50 miles per hour when in its high speed position, and the metering valve 36 will automatically shift when in its high speed position to change the propulsion motor displacement in response to differences in reaction torque applied to the vehicle wheels 18 by the ground or other surface supporting the wheels. For example, if the vehicle is moving from a horizontal surface to an upward sloping surface, the motor 22 will automatically go into a low displacement, high speed position.

FIG. 3 diagrammatically illustrates the hydrostatic motor 22 which includes a non-rotatable swash plate 40 journaled on a rotatable motor shaft 42 and illustrated in its low speed, high capacity starting position. A plurality of main pistons 44 and cylinders 46 are secured to and rotate with the shaft 42 in response to receiving high pressure fluid in one cylinder 46 and discharging the fluid from a diametrically opposed cylinder. The pistons 44 include feet 48 which slide against the non-rotatable swash plate 40 thus imparting rotation to the shaft 42 and the main piston and cylinder units 44,46 slidably connected thereto. A motor swash plate control unit 49 is provided for shifting the swash plate 40 of the motor 22 and includes a piston 50 and cylinder 52 which are provided for controlling the angle of the swash plate 40 and thus the speed range of the motor. The control piston 50 is pivotally connected to the swash plate 40. Abutments 58 and 60 limit the pivotal movement of the swash plate between a maximum displacement, low speed position illustrated as X, and a minimum displacement high speed position illustrated as Y. The hydrostatic motor 22 is preferably a Type AA6V variable displacement piston motor manufactured by the Industrial Hydraulics Division of Rexroth of Bethlehem, Pa., USA. If the preferred motor is used, the low speed angle is about 25° and the high speed angle is set at about 7°. It will be understood, however, that different high and low speed angles may be used with different hydrostatic motors.

Hydrostatic Propulsion Drive System 10

The hydrostatic propulsion drive system 10 (FIG. 2A) is conveniently divided into a propulsion pump assembly 70 which includes the components located within the housing illustrated by phantom lines 72; a propulsion motor assembly 74 that includes the components located within a housing illustrated by phantom lines 76; a propulsion valve assembly 78 illustrated between the motor assembly 74 and the pump assembly 70 outlined within phantom lines 80; a two-speed propulsion shift control assembly 82 illustrated within phantom lines 84. An inching valve 86, a stroking valve 88 and an orifice 90 are included in the pump assembly 70. A sump or tank T is provided to maintain a sufficient supply of hydraulic fluid in the system.

The pump assembly 70 also includes a main positive displacement swash plate pump 100, an auxiliary pump 102, a 220 psi pilot operated relief valve 104, a pilot operated pressure override control valve 106, and a pressure override valve 108.

Before describing the propulsion circuit in detail, it will be understood that the hydrostatic propulsion pump 100 is similar to the hydrostatic motor 22 (FIG. 3) except that the swash plate 110 (FIG. 4) is movable to both sides of the 0° position, and the shaft 112 is driven by the engine 24 (FIG. 1) rather than being driven by fluid from a pump. As is well known in the art, when the pump 100 is being started, the pump swash plate will be positioned in its neutral position substantially normal to its axis of rotation and thus the pistons of the pump will be in a 0 or very low displacement position and will pump very little, if any fluid. Conversely, the swash plate 40 (FIG. 3) of the motor 22 will be positioned at the maximum angle relative to its axis of rotation, thus the pistons 50 of the motor 22 will be at a maximum displacement, low speed position at start up.

In response to starting the engine 24 (FIG. 1) the main pump 100 and the auxiliary pump 102 are both driven by the engine. The auxiliary pump receives hydraulic fluid from tank T (FIG. 2A) and directs the fluid through a screen 118, a passage in a manually operated shut-off valve 120 and through a conduit 126 leading into the auxiliary pump 102. The auxiliary pump directs fluid through a conduit 128 and check valves 130,132 into main high pressure "forward" conduit 134 and "reverse" conduit 136 which establishes a closed loop circuit between the hydrostatic propulsion pump 100 and the hydrostatic motor 22 to charge and maintain the pump and motor charged during operation of the vehicle.

When the pressure in conduit 128 exceeds 220 psi, pilot operated relief valve 104 opens thereby directing fluid into pilot pressure and return lines 140,142. With the pressure override control valve 106, the pressure override valve 108, the pump stroking valve 88 and the inching valve 86 being in their inactive positions as illustrated in FIG. 2A, fluid flows from line 140 through conduit 146, and through an open passage 148 in the central core of pump stroking valve 88. The fluid then flows at equal pressure through conduit 150 to a forward swash plate control unit 152; and through conduits 154 and 156 to a reverse swash plate control unit 158 of the propulsion pump 100. Since the forward and reverse units 152 and 158 are at the same fluid pressure, the pump swash plate 110 (FIG. 4) will remain in its inactive position normal to the axis of rotation of the pump 100 thus providing little or no fluid flow to the propulsion motor 22. It will also be noted that when the stroking valve 88 is in its neutral position and the inching valve 86 is in its fully opened position, fluid will flow freely through the inching valve into a conduit 160 at the same pressure as in the conduits 150 and 156 thus retaining equal pressure on control units 152,158.

When the inching valve 86 is fully open and the pump stroking valve 88 is shifted upwardly to its cross passage forward position (by means to be described hereinafter) fluid from line 140 and 146 flows through a cross passage in valve 88, through the open passage in inching valve 86 and through conduits 160 and 154 thereby retaining the pressure acting on the forward and reverse swash plate control units 152 and 158 at the same pressure and thus the swash plate of the main pump remains normal to its axis and does not pump fluid to the propulsion motor 22. A similar result occurs when the pump stroking valve 88 is pushed downwardly to the reverse position when the inching valve 86 is open. Thus, it is necessary to partially or fully close the inching valve 86 and shift the pump stroking valve into a forward or reverse position before the propulsion pump 100 will pump fluid to the propulsion motor 22.

In order to drive the propulsion motor 22 in a forward direction, the pump stroking valve 88 is placed in the cross passage position and the inching valve 86 is at least partially closed. With the inching valve partially closed, fluid will then flow to both the forward and reverse swash plate control units 152,158 of the pump 100 but the fluid pressure on the forward unit will become progressively greater as the inching valve is progressively closing. Thus, the pump swash plate will be angled away from its neutral non-pumping position at progressively greater amounts and will direct progressively greater amounts of high pressure hydraulic fluid to the propulsion motor 22 as the inching valve is being closed. When the inching valve is fully closed, substantially all the fluid pressure will be on the forward control unit 152 resulting in the maximum flow of fluid from the main pump 100 in the forward direction.

It will be noted that fluid from the auxiliary pump 102 also flows from pilot conduit 128 through conduits 162 and 164, an open parallel passage in pressure override valve 108 when in its illustrated normal position, through the orifice 90 and through the pump stroking valve 88 when in a forward or reverse position. When the inching valve is partially closed, of the portion of the fluid from conduits 162 and 164 flows through the orifice 90 which provides a smooth drive or propulsion control when the orifice is about 0.035 inches in diameter.

It is also apparent that when the pump stroking valve 88 is placed in the parallel passage reverse position and the inching valve 86 is partially or fully closed, the fluid will flow in a reverse direction to motor 22 through the several conduits discussed above. Thus, the pump swash plate will be pivoted in the opposite direction, relative to the neutral position normal to the axis of rotation of the pump, thereby directing high pressure fluid into the motor 22 through the reverse conduit 136 with the low pressure fluid returning to the main pump 100 through forward conduit 134 thereby driving the motor 22 and the vehicle 12 in a reverse direction.

The hydrostatic propulsion motor 22 is controlled by components within the propulsion motor assembly 74, the propulsion valve assembly 78 and the propulsion shift control assembly 82. The motor assembly includes the motor 22 and the automatic motor control or metering valve 36; the valve assembly includes a 165 psi pilot operated relief valve 170, a shuttle valve 172 and two 6000 psi forward and reverse spring loaded pilot operated relief valves 174 and 176, respectively. The propulsion shift control assembly 82 includes a solenoid operated high speed—low speed motor control valve 178.

When the propulsion pump 100 directs fluid to the propulsion motor 22 through forward conduit 134 with the lower pressure fluid returning to the pump 100 through reverse conduit 136, the shuttle valve 172 will be piloted to the right (FIG. 2A).

Low pressure fluid then flows from reverse conduit 136 through conduit 182, passage F in shuttle valve 172 and conduit 184 to relief valve 170. If the pressure in conduit 184 is more than about 165 psi, relief valve 170 will open and fluid will flow through pilot conduits 186 and 188, through a cross passage in the automatic control valve 36, and through a conduit 190 into the high speed side of swash plate control unit 49 illustrated as the right side of the piston and cylinder unit 50,52 in FIG. 3. At this time, fluid from auxiliary pump 102 flows through conduit 162, a parallel passage in solenoid valve 178 and through a conduit 192 to apply an upward force of about 165 psi against the core of the automatic control valve 36 against the urging of an adjustable spring 194.

The upward force from conduit 192 is assisted by high pressure fluid from the propulsion pump 100 which flows through the forward conduit 134, a check valve 196, conduit 198 and enters the low speed side of the motor swash plate control unit 49 (FIGS. 2A and 3). This fluid also flows through conduits 200 and 202 to apply a substantial upward force against the core of control or metering valve 36. The combined forces from lines 192 and 202 will overcome the opposing force applied by adjustable spring 194 thus firmly holding the core of valve 36 in its illustrated cross passage slow speed position. When the control valve 36 is in the illustrated slow speed position, further flow of fluid through conduit 200 is blocked by the core of control valve 36.

Thus, when the control valve 36 is in the illustrated low speed position the high speed side of the motor control unit 49 will be at substantially the same low pressure as in the reverse or return line 136 to the main pump 100; while the pressure on the low speed side of the motor control unit 49 will be at the high pressure in the forward conduit 134. When the control valve 36 is in the low speed position, the core of the control valve 36 will be firmly held in the illustrated position by fluid pressure from conduits 202 and 192. However, as will be described in the next paragraph, when the core of the valve 36 is moved downwardly (FIG. 2A) into the high speed position by the spring 194 the core will act as an infinitely variable metering valve which changes position in response to changes in propulsion forces acting on the wheels of the vehicle, for example, if the vehicle is driven from a flat surface up a grade, the core will move to a lower motor displacement, high motor speed position.

In order to place the propulsion motor 22 in its high speed, low displacement position, the operator actuates an electric switch (not shown) in the cab 34 of the vehicle 12 thereby shifting solenoid valve 178 to its cross passage position. Fluid from auxiliary pump 102 then flows through conduit 162, and is blocked by the core of solenoid valve 178 from flow past the solenoid valve 178. A portion of the auxiliary pump fluid in the lower part of control valve 36 then returns to tank T through the cross passage in valve 178, and another portion of the auxiliary pump fluid flows through a restrictor 204 in parallel therewith, through return line 210, a parallel passage in thermal bypass valve 212 and conduit 213 to tank T. If the temperature of fluid is above 100° F., the thermal bypass valve 212 will shift to its cross passage position and the hot fluid will flow through conduit 214, fan operated oil cooler 216, and conduits 218 and 213 to the tank T. If the pressure in conduit 210 should exceed 75 psi, pilot operated valve 222 will open and will direct the fluid through conduit 213 into tank T. Reduction of fluid pressure acting upwardly on the metering control valve 36 allows the spring 194 to shift the valve 36 to its parallel passage position.

With the valve 36 in its high speed parallel passage position, fluid from line 188 is blocked by the core of valve 36. Fluid in line 200 flows through a parallel passage in control valve 36, conduit 190 and into the high speed side of control unit 49 (FIGS. 2A and 3) thereby providing substantially the same fluid pressure on both sides of the control unit 49. However, the area of the piston 50 (FIG. 3) adjacent the conduit 198 is smaller than the area adjacent the conduit 190 due to the presence of the connecting rod 50'. Accordingly, the effective force acting on the right side (FIG. 3) of the piston 50 is greater than that on the left side of piston 50 thereby moving the swash plate toward its high speed 8° position of FIG. 3.

A summary of the circuits to, and operation of the automatic metering control valve 36 after the inching valve is partially or fully closed is as follows:

1. The low speed side of the propulsion motor cylinder 49 (FIGS. 1 and 3) is pressurized by fluid from main swash plate pump 100 which flows from the pump through conduits 134,198 to the low pressure side of cylinder 49 of propulsion motor 22. Fluid at the same pressure continues from conduit 198 through conduit 202 thus applying a first pressure which urges the core of the metering valve 36 upwardly against the urging or adjustable spring 194 at all times when solenoid valve 178 is energized and is in its cross-passage position.

2. Prior to moving solenoid valve 178 to its cross-passage position, the high pressure side of the propulsion motor cylinder 49 (FIGS. 1 and 3) is not pressurized by fluid from any source. Fluid from the swash plate pump 100 to the propulsion motor 22 flows through conduit 200 but is blocked by the core of metering valve 36 when in its illustrated raised position; and flows from the auxiliary pump 102 and conduits 128 passes through parallel passage in solenoid valve 178 and applies a second upward pressure against the metering valve 36 to maintain valve 36 in its illustrated low speed position against the urging of spring 194 of the metering valve 36.

3. When solenoid valve 178 is energized, auxiliary pump 102 directs fluid through a conduit 162 which is blocked from further flow by the core of valve 178. The "second pressure" previously applied to maintain the metering valve in its illustrated cross-passage position is relieved and flows to tank T through cross-passage in valve 178 and conduits 210 and 213. With a portion of the upward fluid pressure relieved from the metering valve 36, the spring 194 urges the valve core to its parallel passage position thus directing fluid from swash plate pump 100 through conduits 134,198,200 and 190 at substantially the same pressure to both the high and low pressure sides of cylinder 49 (FIG. 3). Since, as previously described, the area of the high speed side of the piston 50 is greater than the area of the low speed side (due to the connecting rod), the propulsion pump will be positioned in its high speed position when at idle speeds or low torque conditions. However, when high torque is applied to the propulsion motor 22, the fluid pressure from swash plate pump 100 increases significantly and provides substantially equal pressure on the low and high sides of the piston 50 and provides an upward force to the core of metering valve 36 from conduit 202. Since adjustable control valve spring 194 is preset at a predetermined force, the core will progressively raise as fluid pressure acting thereon from conduit 200 increases thus progressively moving the core from the parallel passage position to the cross-passage position and progressively shifting the motor from the high speed to the low speed position. The adjustable spring 194, of course, permits setting the metering valve to effect shifting of the motor 22 out of the high speed position in response to different torques. Thus, the metering valve acts as an infinitely variable metering valve which changes position in response to changes in propulsion forces acting on the wheels of the vehicle.

In order to drive the vehicle in reverse, the operator places the pump stroking valve 88 in the parallel passage position and partially closes the inching valve 86 by apparatus to be described hereinafter. The main pump 100 then directs high pressure fluid to the hydrostatic motor 22 through reverse conduit 136 with the low pressure fluid returning to the pump through the forward conduit 134. The solenoid valve 178 is placed in its illustrated slow speed position.

With high pressure in reverse conduit 136, the shuttle valve 172 is piloted to the left (FIG. 2A) thereby directing low pressure fluid in forward conduit 134 to flow through conduit 221 and passage R in shuttle valve 172. If the pressure in shuttle valve 172 is in excess of about 165 psi, relief valve 170 is pivoted open and low pressure fluid flows through conduits 186,188, cross passage in control valve 36 and conduit 190 into the high speed side of the swash plate control unit 49 of the propulsion motor 22. High pressure fluid in reverse conduit 136 opens a check valve 223 thereby directing high pressure fluid through conduits 200 and 198 to the low speed end of the swash plate control unit 49 thereby shifting the swash plate 40 (FIG. 3) to its low speed 18° position. High pressure fluid in conduit 200 also flows through conduit 202 and urges control valve 36 upwardly. Also, fluid from auxiliary pump 102 flows through conduit 162, parallel passage in solenoid valve 178 and conduit 192 to apply an additional upward force on control valve 36 thereby firmly holding automatic control valve 36 in its slow speed position. Thus, in response to closing the inching valve 86, the vehicle 12 will be driven in reverse.

The hydrodynamic propulsion system of the present invention also includes a high pressure protective system which automatically balances the pressure in the forward and reverse conduits 134,136 and moves the pump swash plate to 0 displacement in response to a pressure in either conduit 134 or 136 being in excess of the maximum permissible pressure.

In the event the propulsion motor 22 should become overloaded and the pressure in main forward conduit 134 or reverse conduit 136 (depending upon which direction the vehicle is being driven) should exceed a maximum permissible pressure illustrated as 6000 psi, one of the 6000 psi pilot operated relief valves 174 or 176 will open. For example, if the several valves are positioned to drive the vehicle forward, relief valve 174 is first opened by pressure in excess of about 6000 psi, fluid will flow from forward conduit 134 and conduit 221 thereby piloting relief valve 174 open. High pressure fluid will then flow directly from conduit 134 into a conduit 224, through open relief valve 174 and conduits 226 and 182 thereby directing fluid above 6000 psi into reverse conduit 136 which pilots relief valve 176 open shortly thereafter. This results in providing a balanced pressure in both main conduits 134 and 136 with the pressure being substantially equal and above about 6000 psi. With the pressure in conduits 134 and 136 being substantially equal, shuttle valve 172 returns to its illustrated central position thus stopping the flow of fluid to the motor swash plate control unit 49 thus stopping the motor 22.

Also in response to relief valve 174 opening first, the initial high pressure fluid in conduit 134 will be present in a conduit 228 in the pump assembly 70 which pilots pressure override control valve 106 to its illustrated parallel passage position. With override control valve 106 in its illustrated forward override position, fluid will flow through the parallel passage in valve 106 and will apply downward pilot pressure against pilot operated, spring set pressure override valve 108. When the pilot pressure acting against pressure override valve 108 is less than a preset pressure, for example, about 5500 psi, the core of valve 108 will remain in its illustrated position.

When the system is overloaded and the pressure is in excess of the preset pressure, in this case about 5500 psi, the core of control valve 108 is piloted downwardly thereby preventing the flow of fluid in conduit 164 from flowing in its normal direction through orifice 90. The flow of fluid is reversed and flows through a cross passage in override valve 108 through conduit 146 and a cross passage in pump stroking valve 88 thus directing relatively high pressure control fluid into the reverse control unit 158 of pump 100 until the excessive 6000 psi pressure is reduced below about 5500 psi.

When pressure over 6000 psi occurs at a time when the vehicle is being driven in reverse, the above described pressure protective operations are reversed. The high pressure is first seen in reverse conduit 136, which opens the relief valves 176 and thereafter opens 174 and centers the shuttle valve. The pressure in the lower portion (FIG. 2A) of reverse conduit 136 flows through conduit 232 and pilot line 234 to pilot pressure override control valve 106 upwardly into its cross passage position. The high pressure fluid then flows from reverse conduit 136 through conduit 232 and a conduit 236, through the cross passage in valve 106 thereby piloting pressure override valve 108 downwardly into its cross passage position. Fluid from auxiliary pump 102 then flows through lines 162,164, the cross passage in valve 108, conduit 146, reverse parallel passage in the pump stroking valve 88, and through conduit 150 to the forward pump control unit thereby balancing pressure on the forward and reverse control units 152,158 of the propulsion pump 100 thus shifting the swash plate of the pump 100 to its 0 displacement position.

It will be noted that the high pressure protective system functions in response to excessive high pressure in the hydrostatic pump without requiring any operator assistance. Thus, the operator may have the inching valve 86 fully closed and the pump stroking valve in its forward or its reverse position, and the pressure protective system will perform the above described functions without requiring the operator to actuate any controls.

The function performed by the check valves 130, 132 in the pump assembly 70 is to assure that a supply of hydraulic fluid is always available for compensating for fluid loss by leakage or the like. When the stroking valve 88 is in its parallel passage forward position and the inching valve 86 is at least partially closed, the main pump 100 will direct high pressure fluid from conduit 134 against check valve 130 which prevents flow of fluid therepast. Thus, the lower pressure fluid from auxiliary pump 102 flowing through conduit 128 cannot open check valve 130 but opens check valve 132 thereby directing fluid through conduit 136 to provide a supply of make-up fluid to the motor 22 and other components in the valve assembly when the vehicle 12 is driven forwardly. When the vehicle is driven in reverse, check valve 132 is held closed and check valve 130 opens to provide make-up fluid to the motor 22 and the same components.

A plurality of conventional drain lines are illustrated but not described since they merely drain fluid leakage from the housings of the pump 100, motor 22 and other components.

In order to provide a full disclose of the propulsion drive system 10 it is believed that a description of the stroking valve shift control mechanism 250 (FIG. 4) which controls the stroking valve 88 and the pump swash plate would be helpful. It is also believed that a description of the inching valve control mechanism 252 (FIG. 5) would be helpful.

The stroking valve shift control mechanism 250 (FIG. 4) is connected to a lever 254 of the stroking valve 88 which controls the position of the swash plate 110 of the hydrostatic traction pump 100. A rod 256 connects the lever 254 to a shift lever 258 pivoted at 259 and positioned within the cab of the vehicle. The shifting lever cooperates with a quadrant 260 which has detents 262 thereon which maintains the shifting lever 258 in one of four positions until the operator moves it to another position. The lever 258 may be shifted to the reverse position R in which the pump swash plate 110 is angled in one direction relative to the shaft 112 of rotation of the pump 100; to a neutral position which places the swash plate of the pump perpendicular to the shaft 112; to a low speed position L, at which time the forward speed range of between 0–15 miles per hour and the swash plate is pivoted in the opposite direction relative to the axis at a relatively small angle and low displacement; and the high speed range H of about 0–50 miles per hour with the pump swash plate at a larger angle relative to the shaft 112 with a larger pump displacement.

The inching valve control mechanism 252 (FIG. 5) comprises an accelerator pedal 268 pivoted to the floor of the cab. The accelerator pedal 268 is pivotally connected to an arm 270 of the inching valve 86 by a rod 272 pivoted to one end of a bell crank 274 that is pivotally connected to the vehicle 12. The other end of the bell crank 274 is pivotally connected to the accelerator pedal by a link 276. When the accelerator pedal 268 is not depressed as indicated in FIG. 1, the inching valve 86 is opened thereby opening the passage between conduit 150 and 160 thus equalizing the pressure on both of the swash plate control units 152,158 (FIG. 2) of the pump as previously described.

As above described, the hydrostatic motor 22 is a single direction motor shiftable between a slow speed and a high speed range. It will be understood, however, that it is within the scope of the invention to provide a motor having a swash plate capable of being moved between a high speed, low speed, neutral and reverse position by a motor stroking valve control mechanism that is similar to the motor stroking valve control mechanism 250 illustrated in FIG. 3. A reversible hydrostatic motor of this type when used in the vehicle 12 permits the operator to hydrostatically brake the vehicle by placing the motor stroking valve in reverse and by depressing the accelerator pedal 268 to partially close the inching valve 86 the appropriate amount for the desired reverse flow braking effect.

A hydrostatic motor which may be operated as a high - low speed motor as diagrammatically illustrated in FIG. 3; or as a high - low and reverse motor, is manufactured by Rexroth, Mobile Hydraulics Division, Wooster, Ohio and is identified as the variable displacement piston motor Type AA6V.

Component Motor Drive System

The hydraulic circuit used to power the vehicle 12 when the vehicle is a street sweeper, includes the component motor drive system 10a (FIG. 2B).

The component drive system 10a includes a component pump assembly 292 illustrated within phantom lines 294. The assembly 292 includes a reversible hydrostatic pump 296 and a charge or auxiliary pump 298 both of which are coupled to and driven by the engine 24 (FIG. 1). The charge pump 298 receives its fluid from tank T (FIG. 2A) which flows through conduit 126, parallel passage in shut off valve 120, a conduit 300, through a screen 302 (FIG. 2B) into the pump 298. If the screen should become dirty and the pressure below the screen increases to about 3 psi, a pilot operated relief valve 304 opens causing fluid to flow through conduit 306, a parallel passage in relief valve 304 and conduit 308 into the charge pump 298 thereby bypassing the screen 302.

The charge pump 298 directs fluid at a pressure below about 220 psi through conduits 310 into conduits 312 and 314 and past check valve 316,318 to charge hydrostatic pump 296 through the forward port 320 and reverse port 322 when the swash plate of the pump is in its neutral, 0 displacement position.

The hydrostatic pump 296 is controlled by a stroking valve and an operator controlled shift assembly (not shown) but similar to that disclosed in FIG. 4 except that the shift lever is movable only between reverse, neutral and low positions. With the swash plate of pump 296 in its neutral position, the fluid from charge pump 298 charges the hydrostatic pump 296 and other components in the motor drive system 290 as above described.

When it is desired to drive the hydrostatic pump 296 in its forward direction, the operator places a shift lever in its forward position thus directing charging fluid through conduits, 310,312, check valve 316 and forward conduit 320 into the pump 296 to charge the pump.

The hydrostatic pump 296, when in its forward position, then pumps high pressure fluid through forward conduit 320 which closes check valve 316.

At an output pressure below about 3500 psi, high pressure fluid flows through conduit 320 to a hydraulic elevator motor 324 in a forward direction and pilots a check valve 326 to its open position in return conduit 328. The fluid from the outlet of the elevator motor 324 is prevented from flowing into discharge conduit 328 by a check valve 330.

If it is desired to drive only the elevator 31 (FIG. 1) and pick-up broom 26, all of the high pressure fluid flows through conduit 332, a parallel passage in left gutter broom solenoid valve 334, through conduit 336, through parallel passage in a right gutter broom solenoid valve 338, through conduits 340, 357 into pick-up broom motor 342 thereby driving the pick-up broom 26 and elevator 31 in their forward operative directions. The fluid discharged from the pick-up broom motor 342 is returned to tank T (FIG. 2A) through conduit 344, open check valve 326, conduits 328 and 346, a pilot operated relief valve 348 which opens at 100 psi, return conduits 350, 210 (FIG. 2A), open passage in thermal bypass valve 212 and conduit 213 to tank T.

It will be noted that a conduit 352 and conduit 332 provide substantially the same pressure on opposite sides of a left gutter broom motor 354 when the solenoid valve 334 is in its open parallel passage position. Thus, the left gutter broom 354 is not driven when valve 334 is open since the open valve 334 and the conduits 332,352 bypass the left gutter broom motor 354. Similarly, when valve 338 is open equal pressure is applied on opposite sides of a right gutter broom motor 356 from conduits 340 and 357 which bypasses the right gutter broom 356. It will also be noted that a conduit 358 cooperates with circuits containing the pump 296 and motor 324,354,356 and 342 to define a closed loop hydrostatic circuit. The portion of this closed loop circuit to the reverse check valve 318 also holds the check valve 318 closed during forward operation of the pump 296 since the pressure of the fluid in the pick-up broom motor 342 must be at least 100 psi as determined by the pilot operated relief valve 348 in return conduit 350.

When it is desired to drive the left gutter broom 28, solenoid valve 334 is energized by closing a switch in the cab 34 thereby blocking upward flow therethrough with the check valve passage 359 in valve 334 being closed. Thus, the fluid flows through and drives left gutter broom motor 354 while bypassing right gutter broom motor 356 through conduits 340 and 357 and the parallel passage in solenoid valve 338. When it is desired to drive the right gutter broom motor 356 but not the left gutter broom motor 354, valve 334 is placed in its illustrated parallel passage position and solenoid valve 338 is energized by a switch in the cab 34 shifting the valve to its check valve passage position 362 which blocks flow of fluid therethrough, thus causing the fluid to drive the right gutter broom motor 356 and right broom 30.

In the event the elevator motor 342 should become jammed with debris, the jam may be cleared by driving the elevator motor 342 in reverse. The operator accomplishes this by placing the shift control lever similar to the lever 258 (FIG. 4) in reverse. The fluid from charge pump 298 then enters the stroking valve (not shown) of the hydrostatic pump 296 thereby shifting the pump swash plate to its reverse position through circuits (not shown) but similar to that described in regard to the propulsion pump 100. The high pressure fluid then flows out of pump reverse conduit 322, closes reverse check valve 318 and through flows conduit 358 and pick-up broom motor 342 in a reverse direction. With solenoid valves 338 and 334 in either their parallel passage positions or in their check valve passage positions, the high pressure fluid flows through the valves 338,334 and conduit 332 to close check valve 330. A portion of this fluid flows into elevator motor 324 thereby driving the elevator in reverse until the elevator jam is broken. When the elevator jam is broken, the operator merely returns a shift lever similar to lever 258 (FIG. 4) to its low L position thereby driving the elevator motor 324, pick-up broom motor 342 and usually one of the gutter broom motors 354 or 356 in the proper direction without changing the position of the solenoid valves.

In order to protect the component motor drive system from damage due to excessive pressure in the system, a pair of 3500 psi pilot operated relief valves 364 and 366 are connected between a forward conduit 368 and the reverse conduit 358, respectively. A pair of towing valves 370,372 are connected to the conduits 368 and 358, respectively. As illustrated in FIG. 2B, the adjacent sides of the relief valves 364,366 are connected together by conduits 374; the adjacent sides of towing valves 370,372 are connected together by a conduit 376; and a conduit 378 interconnects conduits 374 and 376.

Thus, when the pump 296 is driven in a forward direction and the pressure in conduit 368 exceeds 3500 psi due to a debris jam or the like, relief valve 364 will open directing high pressure fluid through conduits 374, 378 and 376 thereby opening the check valve 380 in towing valve 372 thus providing substantially the same pressure in the forward and reverse conduits 358,368 which pilots relief valve 366 open. In this way the pressure on the forward and reverse sides of the pump 296 are substantially equal thereby circulating fluid at equal pressure through forward conduits 320, 368, open passage in relief valve 364, conduit 374, open passage in relief valve 366 and reverse conduits 358 and 322 to the reverse side of the pump 296 through the above mentioned closed loop.

If it is desired to tow the sweeper 12, towing valves 370,372 are manually opened thereby equalizing pressure on the forward and reverse sides of the pump 96 and preventing the motors 324,354,356 and 342 from being driven.

From the foregoing description it is apparent that the hydrostatic propulsion drive system of the present invention is capable of being driven at a relatively high speed of 50 miles per hour, and when in its high speed range includes an automatic metering control valve which is responsive to road torque acting on the vehicle wheels for infinitely varying the propulsion motor displacement and speed to prevent overloading of the propulsion motor. The hydrostatic motor drive system of the present invention is provided for driving the motor driven components of the illustrated street sweeper. These components are driven by a reversible hydrostatic pump which is primarily driven in a forward direction but may be driven in a reverse direction to break debris jams in a debris elevator or the like.

Although the best mode contemplated for carrying out the present invention has been herein shown and described, it will be apparent that modification and variation may be made without departing from what is regarded to be the subject matter of the invention.

What is claimed is:

1. A hydrostatic propulsion drive system for driving a vehicle having a pair of drive wheels and at least one steerable wheel supported on a support surface, comprising:

an engine in said vehicle, means defining a variable displacement hydrostatic motor on said vehicle and connected in driving engagement to said drive wheels, means defining a variable displacement hydrostatic pump connected in driven engagement to said engine and in driving engagement to said motor, means defining an adjustable inching valve, shifting means for enabling an operator to shift said pump between a neutral position and reverse, low speed and high speed driving positions, accelerator means connected to said inching valve for enabling the operator to vary the capacity of fluid directed by said pump to said hydrostatic motor, a two-position valve means for selectively positioning the hydrostatic motor in a low speed position and in a high speed position, and means defining a metering control valve responsive to variations in reaction torque between the drive wheels and said support surface for varying the displacement and speed of said motor when said two position valve means is in the high speed position, said metering control valve means having a low speed driving position and a high speed driving position and being maintained in its low speed driving position in response to said two position valve means being positioned in its low speed position, said shifting means being in one of its driving positions, and said inching valve being at least partially closed.

2. A hydrostatic propulsion drive system for driving a vehicle having a pair of drive wheels and at least one steerable wheel supported on a support surface, comprising:

an engine in said vehicle, means defining a variable displacement hydrostatic motor on said vehicle and connected in driving engagement to said drive wheels, means defining a variable displacement hydrostatic pump connected in driven engagement to said engine and in driving engagement to said motor, means defining an adjustable inching valve, shifting means for enabling an operator to shift said pump between a neutral position and reverse, low speed and high speed driving positions, accelerator means connected to said inching valve for enabling the operator to vary the capacity of fluid directed by said pump to said hydrostatic motor, a two-position valve means for selectively positioning the hydrostatic motor in a low speed position and in a high speed position, and means defining a metering control valve responsive to variations in reaction torque between the drive wheels and said support surface for varying the displacement and speed of said motor when said two position valve means is in the high speed position, said metering control valve means having a low speed driving position and a high speed driving position and being movably positioned into said high motor speed position in response to said two position valve means being positioned in its high speed position, said shifting means being in one of said driving positions, and said inching valve being at least partially closed.

3. An apparatus according to claim 2 wherein said metering control valve includes a movable valve core which is urged in one direction by a spring, and is urged in the opposite direction by hydraulic pressure from one source when in said low speed position and from two sources when in a floating high speed position, said valve core when in its high speed position being moved progressive amounts against the urging of said spring in response to progressive variations in hydraulic pressure acting on said core from said one source in response to variations in said reaction torque.

* * * * *